Patented Feb. 26, 1946

2,395,538

UNITED STATES PATENT OFFICE 2,395,538

ANESTHETIC SALTS OF P-AMINOBENZOIC ACID ESTERS

David Curtis, New York, N. Y.

No Drawing. Application May 19, 1942,
Serial No. 443,658

4 Claims. (Cl. 260—471)

The present invention relates to anesthetic salts and to anesthetic solutions and preparations and to methods for preparing such salts, solutions and preparations, and is a continuation in part of my application Serial No. 54,913, filed December 17, 1935, which has since issued as Patent No. 2,286,718 and my application Serial No. 417,712, filed November 3, 1941, which has since issued as Patent No. 2,382,546.

It is an object of the present invention to provide a series of new anesthetic salts of great potency and of improved solubility characteristics.

It is another object of the present invention to provide solutions of generally water-insoluble anesthetic substances which contain substantial amounts of the anesthetic substance and which are relatively stable.

In my copending application Serial No. 54,913, I have described and claimed cinnamic acid salts of anesthetic bases and have also stated that similar salts of anesthetic bases may be formed with hydrocinnamic or beta-phenyl propionic acid ($C_6H_5.CH_2.CH_2.COOH$). The present invention is directed to salts of esters of amino benzoic acid with b-phenyl propionic acid and with other addition products of cinnamic acid, and more particularly to the salts of the alkyl esters of amino benzoic acid with such acids. Cinnamic acid, like other unsaturated compounds, forms addition products with halogen hydrides, hypochlorous acid, bromine, chlorine, iodine, sodium bisulphite, and the like. These addition products are derived from cinnamic acid by the opening of the double bond carbon linkage between the alpha and the beta carbons of the cinnamic acid radicle of cinnamic or substituted cinnamic acid molecule. Each of these two carbons acquires an additional free bond and may be linked through this additional free bond to another univalent atom or radicle. Or the two carbons may both be linked to a bivalent atom or radicle.

The alkyl esters of amino benzoic acid that may be linked to the addition products of cinnamic acid include benzocaine or ethyl p-amino benzoate, propoesin or propyl p-amino benzoate, butesin or n-butyl p-amino benzoate and orthoform or methyl metamino p-oxybenzoate, and other similar compounds.

The substituted forms of cinnamic acid that may be combined with the anesthetic esters of amino-benzoic acid, both alkyl and alkamine, include di-iodo cinnamic acid, di-bromo cinnamic acid, alpha methyl cinnamic acid ($C_6H_5.CH:-CCH_3.COOH$)

also substitution products of b-phenyl propionic acid with hydrochloride, hydrobromide, hydroiodide, as, for instance, b-phenyl chlor-propionic acid, and the like.

The alkyl amino benzoates and the addition products of cinnamic acid combine in equimolecular proportions, and may be formed by several different methods.

The alkyl amino benzoate salts of beta-phenyl propionic acid may be formed by dissolving equimolar quantities of the base and acid in a volatile vehicle, such as alcohol, acetone, ether, and the like, and warming the solution on a water bath for a little while, and then removing the volatile vehicle, preferably by spontaneous evaporation.

Such salts may also be formed by the direct fusion of the ingredients on a water bath, liquefaction taking place readily, and then cooling the mass and dissolving it in a suitable volatile vehicle and crystallizing it from the volatile vehicle.

Another method of forming these salts of beta-phenyl propionic acid is to effect combination in warm water, wherein it takes place readily, forming an oily mass. A water-miscible solvent, such as acetone or alcohol or the like, is then added and the formed salt removed by lowering the temperature of the solvents to several degrees below 0° C., to effect crystallization or separation, the volatile vehicle preventing the formation of ice.

Still another method is to form the salts in a volatile vehicle, such as acetone, then heating the solution on a water bath and precipitating the salt in the form of an oily mass, through the addition of water. The mixture may then be cooled to below 0° C., to effect crystallization as much as possible, and the solvent mixture then decanted. The residue is then taken up with ether and the ether then driven off. Instead of ether, a mixture of ether and a small amount of alcohol or acetone or both may be used.

The salts may also be formed through the double decomposition method, from an oxalate of the base treated with a calcium salt of the acid in a mixture of acetone and water. The mixture is warmed and stirred to complete precipitation of the calcium oxalate, which is then removed, the anesthetic salt remaining in solution from which it may be removed by any of the suitable methods indicated above. The calcium oxalate may be then washed with a volatile solvent to remove any of the anesthetic salt that may have precipitated with it.

By way of specific examples, the following may be given:

*Example 1.*—15.013 gms. of b-phenyl propionic acid and 16.514 gms. of benzocaine base are brought into a sufficient volume of acetone to effect solution—about 25 to 50 cc. The solution is then warmed on a water bath for about 10 minutes, to assure complete dissolution and union. The acetone is then removed spontaneously or under slightly reduced pressure. White crystals of benzocaine b-phenyl propionate are left as the residue. These crystals have a low melting point; the entire mass easily liquefying on a water bath.

The ingredients of the foregoing example may be fused on the water bath, directly, without the presence of any solvent. The crystals will form on cooling. If desired, the melt, before or after solidifying, may be taken up in a volatile vehicle and crystallized therefrom.

*Example 2.*—Similarly, 17.916 gms. of propyl p-amino benzoate and 15.013 gms. of b-phenyl propionic acid may be combined. The product is a white crystalline mass, also easily liquefying on the water bath.

*Example 3.*—1.791 gms. of propyl p-amino benzoate and 1.5013 gms. of b-phenyl propionic acid are dissolved in about 7 cc. of acetone and warmed on the water bath for about 2 or 3 minutes. To this solution about 30 cc. of water are added, and an oily mass settles at the bottom of the container. The contents are then cooled to about 5–6 degrees below 0° C., for a few hours. The water is then removed and the residual mass taken up with ether and recrystallized therefrom. The same white crystals are obtained.

*Example 4.*—19.318 gms. of butesin are condensed with 15.013 gms. of b-phenyl propionic acid in about 35 to 50 cc. of acetone, and warmed on the water bath for about 10 minutes. The acetone is removed, leaving white crystals arranged in dendritic form. The crystals easily liquefy on the water bath.

*Example 5.*—1.6712 gms. of orthoform are condensed with 1.5013 of b-phenyl propionic acid on the water bath, in the presence of 5 cc. of acetone. The mass is warmed for a minute or two and the acetone removed, leaving fine crystals, slightly reddish in color. The reddish color is probably due to slight oxidation of the orthoform, which may be obviated by crystallizing in the presence of a small amount (0.025 gm.) of sodium hydrosulphite, $Na_2S_2O_4$, or other suitable anti-oxidant.

The salts of the present invention may also be formed in concentrated solutions of procaine salts, in which case the solutions may be directly used, when properly adjusted with the addition of a vaso-constrictor, such as adrenalin or its substitutes, and with suitable anti-oxidants.

*Example 6.*—9 gms. of b-phenyl propionic acid and the equimolecular amount of 14.16 gms. of procaine base are dissolved in 10 cc. of water. The mixture is stirred and warmed until solution is complete, with the formation of procaine b-phenyl propionate. Into the resulting solution, 3.0026 gms. of b-phenyl propionic acid and 3.3028 gms. of benzocaine are added. The mixture is stirred and warmed until solution takes place.

The same amount of benzocaine b-phenyl propionate may be compounded or dissolved in a solution of 15 gms. of procaine hydrochloride in 10 cc. of water. The benzocaine salt in such a solution will stand up longer in solution than benzocaine base alone dissolved in the same solvent.

When it is desired to put the above resulting solutions directly to use, as when it is desired to produce intensified surface anesthesia in the nasal, ear or other body cavities, epinephrine or its salts to make about a 0.1% concentration, and suitable quantities of anti-oxidant, to contain, for instance, from 0.1% to 0.2% sodium thiosulphate and from 0.05% to 0.1% of benzaldehyde sodium bisulphite, may be added. Various other vaso-constrictors and anti-oxidants, in varying proportions, may, of course, be used.

The foregoing solutions may be diluted with glycerine or with glycerine and a volatile solvent, for use in saturating bandages and surgical dressings.

The alkyl amino benzoate b-phenyl propionates, in the crystal or molten form, may be taken up in a suitable volume of glycerine, so as to make up, preferably, a 5% solution, and such solution will stand up, in the warm state or even at room temperature, sufficiently long for use during a clinical period. In the case of the less soluble butesin b-phenyl propionate, the addition of about 10 to 15% of ethyl glycerine ether should be added to the glycerine to effect solution. The more soluble orthoform b-phenyl propionate will remain in solution in glycerine much longer than the alkyl p-amino benzoate salts.

The salts of the present invention, as well as other anesthetic bases and salts and other medicinal products, such as those of the sulfa group, as sulfanilamide, for instance, are readily dissolved and remain sufficiently long in solution at least for clinical periods, in aqueous solutions of the inner ethers or inner anhydrides of the hexahydric or sugar alcohols. These derivatives of the hexahydric alcohols include the di-anhydrides, such as isomannide ($C_6H_8O_2(OH)_2$), sorbide ($C_6H_8O_2(OH)_2$), and to a lesser extent the mono-anhydrides, such as sorbitan ($C_6H_8O(OH)_4$), and other inner ethers of other polyhydroxy alcohols.

Besides being effective solvents, these inner anhydrides of the sugar alcohols are non-toxic and non-irritating, and their aqueous solutions may readily be used as vehicles whereby water-insoluble anesthetic substances may be used for injection purposes, as well as for surface application.

The water solutions of the inner ethers of the sugar alcohols are miscible with glycerine, so that preparations may be made containing ingredients which are soluble in only one of the two solvents, and also makes possible the use of such inner ethers and glycerine mixtures to saturate bandages and dressings either by impregnating directly in such mixtures or by first diluting with a suitable volatile solvent.

*Example 7.*—2 gms. of benzocaine base are dissolved in 40 cc. of an approximately 84% solution of sorbide in water, by heating on a hot plate over a low flame and stirring. Such solution is highly potent to mucous tissue and will remain clear for a clinical period, at least 5 hours. Rewarming will redissolve any precipitation formed on standing.

To prolong the solubility of solutions such as the above, 10 cc. of glycerine ether, such as methyl or ethyl glycerine ether, may be added to the sorbide solution or to the final solution.

*Example 8.*—2 gms. of benzocaine are dissolved in a mixture of 20 cc. of sorbide and 10 cc. of glycerine by heating on a hot plate. The solution remains clear for at least 5 hours. Rewarming will redissolve any precipitate formed on standing.

Similarly, solutions of propoesin and orthoform bases may be prepared in aqueous sorbide solutions. The orthoform solution will stand up the longest.

Example 9.—3 gms. of benzocaine b-phenyl propionate are dissolved in 20 cc. of an approximately 84% aqueous solution of sorbide, forming about a 15% solution, wt./vol. of the salt. The solution remains clear long enough for clinical use.

Similarly, solutions of about 15% concentration of propoesin b-phenyl propionate and orthoform b-phenyl propionate in 84% aqueous sorbide solution may be prepared, which will likewise stand up for at least a clinical period. Of course, less concentrated solutions will stand up for longer periods. To augment the solubility period of such solutions, 10 to 15 percent of a suitable glycerine ether may be added.

The less soluble salt, butesin b-phenyl propionate may also be dissolved in a similar solvent, but in lesser concentration to obtain stability for similar periods, the addition of a glycerine ether also helping to prolong the solubility period.

In dissolving orthoform b-phenyl propionate in the sorbide solution, the addition of an antioxidant to the solvent is advisable, to prevent rapid oxidation. Orthoform b-phenyl propionate stands up the longest in the sorbide solution.

Example 10.—5 gms. of benzocaine cinnamate are dissolved in a mixture of 10 cc. of 84% aqueous sorbide solution and 50 cc. of glycerine. Although benzocaine cinnamate is not soluble in glycerine, in the cold, the above solution remains clear and substantially stable for about 5 or 6 hours. Increasing the amount of sorbide, increases the solubility period of the benzocaine cinnamate.

Benzocaine gluconate, benzocaine acetyl salicylate, benzocanie citrate, benzocaine borate, and other organic and inorganic acid salts of benzocaine and of other alkyl esters of amino benzoic acid may likewise be dissolved in aqueous sorbide solution or its mixture with glycerine, especially with the addition of a small volume of a glycerine ether, or of glycol, propylene glycol and their ethers and mono-ethyl ether of diethylene glycol, if indicated.

It is also possible to dissolve alkamine esters of amino benzoic acid in an aqueous solution of the inner anhydrides of the sugar alcohols.

Example 11.—4 gms. of procaine base are dissolved in 30 cc. of an 84% aqueous sorbide solution, making about a 13% concentration of procaine base. The solution will stand up for more than 48 hours.

Example 12.—5 gms. of procaine base and 5 gms. of benzocaine base are dissolved in 50 cc. of the sorbide solution, by warming on a hot plate, making a highly potent surface anesthetic solution, and it stands up for about 24 hours.

Example 13.—2 gms. of benzocaine base and its equimolecular proportion of 1.82 gms. of b-phenyl propionic acid are dissolved in a mixture of 40 cc. of glycerine and 20 cc. 84% aqueous sorbide solution. The solution stands up for at least 40 hours.

Example 14.—1 gm. of orthoform is dissolved in 20 cc. of 84% aqueous sorbide solution. The solution remains stable for at least 48 hours. Similarly, orthoform b-phenyl propionate may be formed and dissolved in such sorbide solution, forming a relatively stable solution.

Example 15.—12 gms. of sorbitan, the monoanhydride of sorbitol, are dissolved in 40 cc. of glycerine, by heating on a hot plate. 2 gms. of benzocaine are stirred in and dissolved on continuous heating. The solution remains clear for several hours. Separation may be cleared on warming. When the molecular equivalent of 1.82 gms. of b-phenyl propionic acid is dissolved in the above mixture, to form benzocaine b-phenyl propionate, a flocculent precipitate appears. Diluting with 100 cc. of water, a solution strongly anesthetic to mucous tissue is obtained, which may be used as a dressing.

Example 16.—2 gms. of sulfanilamide are dissolved in 25 cc. of an 84% aqueous sorbide solution. A clear solution is obtained which stands up for at least 48 hours.

Example 17.—In a similar volume of a similar sorbide solution, 1.5 gms. of b-phenyl propionic acid and its molecular equivalent, 1.72 gms. of sulfanilamide are dissolved by warming on a hot plate, forming a phenyl propionic acid salt of sulfanilamide.

Example 18.—5 gms. of sulfanilamide are dissolved in a mixture of 10 cc. of 84% aqueous sorbide solution and 40 cc. of glycerine, making a 10% solution, wt./vol., thus considerably increasing the solubility of sulfanilamide in glycerine. The solution remains clear for at least a clinical period.

The salts of the present invention may be compounded into tablets, together with other desired ingredients such as vaso-constrictors, antioxidants, salt, antiseptic substances, and the like, using dextrine or sorbitol, mannitol, or the like, as a binder.

It may here be stated that addition and substitution products of other derivatives of acrylic acids, besides cinnamic acid may be combined with the alkyl and other esters of amino benzoic acid. However, by the term "addition product," as used in the claims, refers to saturated compounds which are formed by the breaking up of the double bond linkage between the alpha and beta carbon atoms of a cinnamic acid radicle, as explained above.

This completes the description of the products and methods of the present invention. It is to be understood that the examples given are intended merely for illustration and are not intended, in any way, to limit the scope of the invention to their specific combinations or other details, as it is obvious that many variations in the combinations of the reacting ingredients, the solvents and solutes used, and their proportions, may be made within the spirit and scope of the invention and of the claims hereto appended.

What I claim is:

1. A salt of an alkyl ester of p-amino benzoic acid in which the alkyl radicle is a member of the group consisting of ethyl, propyl and butyl radicles, and b-phenyl propionic acid.

2. A salt of ethyl p-amino benzoate and b-phenyl propionic acid.

3. A salt of n-butyl p-amino benzoate and b-phenyl propionic acid.

4. A salt of propyl p-amino benzoate and b-phenyl propionic acid.

DAVID CURTIS.